3,465,337
BEAM SCANNING DEVICE OF SONIC OR ELECTRIC WAVE OR THE LIKE
Isokazu Tanaka, 2–40–13, Hon-amanuma, Suginami-ku, Tokyo, Japan, and Shizuo Kurimura, 216 Karasuyama Jutaku, 790 Karasuyama-machi, Setagaya-ku, Tokyo, Japan
Filed Dec. 14, 1967, Ser. No. 690,676
Claims priority, application Japan, Dec. 27, 1966, 41/84,743
Int. Cl. G01s 9/06
U.S. Cl. 343—11    7 Claims

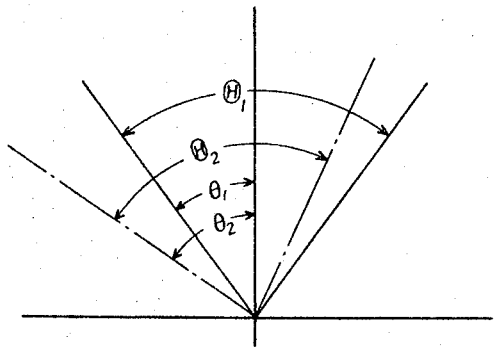
Fig. 4(a)
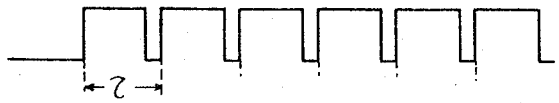
Fig. 4(b)
Fig. 4(c)
Fig. 4(d)
Fig. 4(e)
Fig. 4(f)
INVENTORS
ISOKAZU TANAKA
SHIZUO KURIMURA
BY
ATTORNEY

United States Patent Office 3,465,337
Patented Sept. 2, 1969

ABSTRACT OF THE DISCLOSURE

A beam scanning device for sonic and electromagnetic waves wherein an exceedingly narrow beam is produced and moved at a selected rate and through a selected angle, which may be initiated from a selected starting point, by electronic control of the transducers, which transducers may also be utilized to receive the reflected signals.

---

This invention relates to beam scanning apparatus using sonic, ultrasonic or electromagnetic waves.

To detect the position of an object by emitting a beam of sonic or electromagnetic waves in the direction of the object and detecting an echo reflected by and returning from the object, various kinds of systems, such as sonar devices utilizing sonic waves, radar devices utilizing electromagnetic waves and the like, have been developed. This invention relates to a novel scanning device using electromagnetic waves in a radar device, or sonic waves in a sonar device or the like and particularly to a beam scanning device which scans electrically a space within a desired range at a desired speed with a radial beam having a narrow directional characteristic.

Prior sonar and radar devices used in an echo detecting system are those which scan a space in the direction of an object. They are provided with a transmitting and receiving transducer and an antenna having a sharp directivity using a beam or beams of energy in the form of sonic or electric waves and indicate time lag, direction, magnitude and the like of an echo reflected by the object and returning therefrom to recording equipment such as a cathode ray tube operated in synchronism therewith to detect direction, distance, size, shape and the like of the object.

An example of a prior beam scanning device in a sonar or radar device is a device for mechanically rotating the direction of radiation of a transmitting or receiving transducer or of an antenna by using a motor but it is difficult to make the scanning speed of such a device high since it has a complicated structure and substantial mass.

Another example of a prior beam scanning device involves a device for scanning at high speed with a sharp radiant beam by sequentially switching a number of transmitting or receiving transducers or antennae arranged to be directed in a chosen direction has been developed but only used in special cases since it is large and expensive.

Still another device for scanning and having the effect of directing a radiant beam consists in the location of a number of transmitting or receiving transducers or antennae in a predetermined relation to the object and changing the phase differences of the sonic or electromagnetic waves passing through these elements according to a preselected plan to cause the direction of the radiant beam to undergo a scanning action. However, such a device has not been found advantageous as its structure must be large in order to obtain adequate phase shift in the low frequency regions such as in the case of sonic waves, and that the structure of its phase shifter must be precise and therefore becomes complicated in the relatively higher frequency region utilizing electromagnetic waves.

This invention overcomes the abovementioned disadvantages and provides a novel radiant beam scanning device which is relatively simple in structure but can cause a radiant beam of sonic or electromagnetic waves to scan within a predetermined scanning angle at a selected scanning rate and has a scan start angle, as well as an angular scanning range, which can be freely adjusted over a substantial range.

In order that the invention may be clearly understood and readily carried into effect, apparatus in accordance therewith will now be described, by way of example, with reference to the accompanying drawings, in which:

FIGURE 4(a) is a beam position diagram and FIGURES 4(b)–4(f) are signal waveforms illustrating one method for determining a scanning angle and a scan start angle of a beam scanning device in accordance with the invention.

While this invention concerns a beam scanning device useful for both electromagnetic or sonic waves, it will be described as a beam scanning device using sonic waves for the purposes of simplicity.

Figure 1:
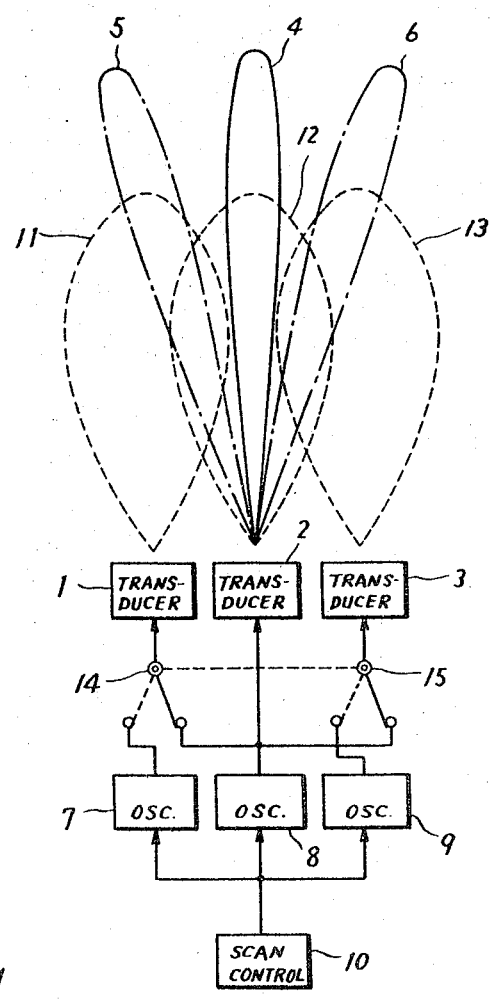
FIGURE 1 is an explanatory diagram illustrating the principle of operation of a beam scanning device in accordance with the invention.

FIGURE 1 illustrates the operation of the beam scanning device of this invention utilizing a sonic beam. Elements 1, 2, and 3 of a transmitting transducer are assumed to have broad directional characteristics represented by the patterns 11, 12, and 13 when individually energized. It is well known both theoretically and practically that the summed energy of sonic waves emitted from the respective elements 1, 2, and 3, can be concentrated into a beam 4 having a high degree of directivity when the elements are simultaneously driven electrically at the same amplitude and phase and have substantially uniform characteristics.

With this invention the beam 4 is automatically deflected using an electronic device. That is to say, the narrow beam 4 is deflected at a desired rate and within an angle as represented by the beam outlines 5 and 6. Oscillators 7, 8, and 9 have substantially equal output amplitudes. The frequencies of the oscillators are chosen to have desired differences within the operating bands of the elements 1, 2, and 3. A scan control device 10 controls the scanning rate, the oscillation start times and oscillation stop times of the oscillators 7, 8, and 9 and also controls the phase differences of the oscillators 7, 8, and 9.

If scan stop switches 14 and 15 are in the positions shown by full lines, the elements 1, 2, and 3 are driven only by the oscillator 8 and the summed radiant beam is concentrated in the narrow directional beam 4. If the scan switches 14 and 15 are in the positions shown by the dotted lines, the elements 1, 2, and 3 are individually driven by the oscillators 7, 8, and 9 and the frequencies of the respective oscillators are made slightly different one from the others. Therefore, the radiant beam is concentrated in a direction corresponding to the instantaneous phase differences of the respective oscillators and said direction of the beam moves in a predetermined manner.

When the oscillators 7, 8, and 9 are in substantially the same phases at the start of the oscillation due to a control signal, the resultant energy emitted from the elements 1, 2, and 3 is in front of the element 2 as shown by the narrow directional beam 4. However, when the phase differences based upon frequency differences of the oscillators 7, 8, and 9 increase, the resultant beam of energy will be deflected within the range shown by outlines 5 and 6 and will always maintain a high degree of directivity similar to that of the beam 4. Accordingly, if the oscillators 7, 8, and 9 are adjusted to provide selected frequency differences, they will exhibit an effect equivalent to the phase difference between the electric signals driving the elements 1, 2, and 3. Since these elements are operated sequentially within a predetermined time and are controlled by the scan control device 10 to control the periods of oscillation and the phase differences, the broad lobes 11, 12 and 13 of the elements 1, 2 and 3 can be composed into sharp lobes as shown by the narrow beam 4 and said narrow beam 4 can be repeatedly caused to scan automatically in the range shown by the outlines 5 and 6.

With this invention the scanning angle can be controlled and the scan start angle of the transmitted or received beam will have high directivity as shown by the beam 4 in FIGURE 1 and will function within a predetermined range. One procedure for establishing the scanning angle and scan start angle will be described referring to FIGURE 2 showing a sonic wave scanning device.

Figure 2:
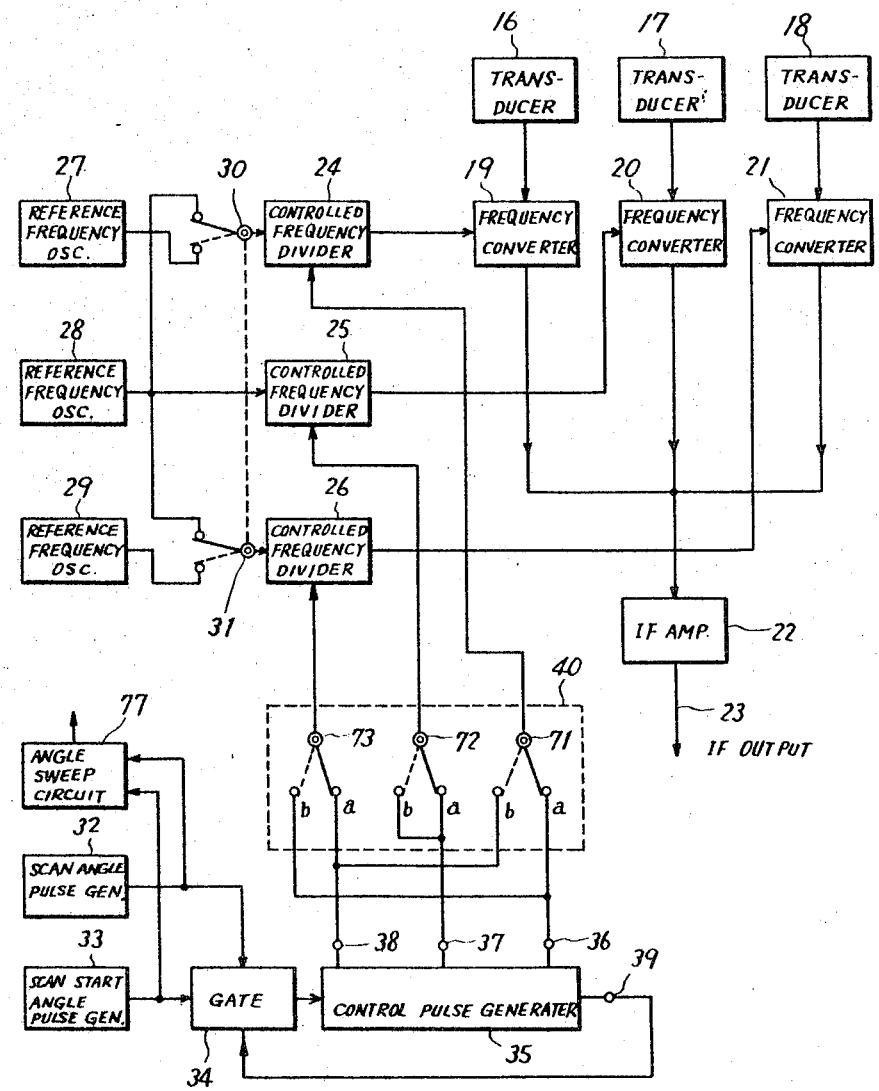
FIGURE 2 is a block diagram of a beam scanning device in accordance with the invention.

Referring to FIGURE 2, elements 16, 17, and 18 are receiving transducer elements having substantially uniform characteristics and are assumed to be arranged in position so that they exhibit broad directivities the same as the broad beam patterns 11, 12, and 13 of FIGURE 1 when used individually but have a sharp directivity pattern similar to the narrow beam 4 in FIGURE 1 when operated so that the phases of the received waves of these receiving transducers coincide properly. Frequency converters 19, 20 and 21 mix the electrical outputs of the elements 16, 17, and 18 and the outputs of controlled frequency dividers 24, 25, and 26, which will be described below, to produce outputs having frequencies, which are the sums or differences of both inputs which are then supplied to an intermediate frequency amplifier 22. The intermediate frequency amplifier 22 amplifies this signal to produce an intermediate frequency output 23. Numerals 27, 28, and 29 denote, for example, reference frequency oscillators utilizing quartz crystal control. Switches 30 and 31, which are similar to the scan stop switches 14 and 15 of FIGURE 1, are inserted between said reference frequency oscillators and the controlled frequency dividers 24, 25 and 26. The respective frequencies of the reference frequency oscillators 27, 28, and 29 are local reference frequencies and determine the outputs of the controlled frequency dividers 24, 25, and 26 required for obtaining the intermediate frequency output 23 and are determined so that the output signals of the controlled frequency dividers 24, 25 and 26 have frequency differences within allowable bands of transducers 16, 17, and 18.

The above frequency differences provide a high degree of directivity and the phase differences cause the apparatus to automatically scan a selected angle for incoming waves based upon the same principle described above in connection with the oscillators 7, 8, and 9 in FIGURE 1. The controlled frequency dividers 24, 25, and 26 enable the attainment of adjustable automatic scanning and consist of multivibrator circuits which may be connected in cascade.

A scanning angle pulse generator 32 is provided for determining the scanning angles $\oplus_1$, $\oplus_2$ . . . as shown in FIGURE 4(a), in which, for example, use is made of a multivibrator of the variable frequency type, and is arranged to generate pulses of period $\tau$ as shown in FIGURE 4(b). A scan start pulse generator 33 is provided for determining the scan start angles $\theta_1$, $\theta_2$ . . . , as shown in FIGURE 4(a), which may also use a multivibrator of the variable frequency type generates pulses of short periods as shown in FIGURE 4(c). The pulse outputs of the respective pulse generators 32 and 33 are supplied to a gate circuit 34. The gate circuit 34 becomes conductive when the leading edges of the pulses (b) occur, that is, at the times $t_{11}$, $t_{12}$, $t_{13}$ . . . and feeds the pulses (c) to a control pulse generator 35.

The control pulse generator 35 is a multi-stage shift register and, in this embodiment, is provided with three output terminals 36, 37, and 38 and a reset terminal 39. The first output terminal 36 is connected to contact $a$ of a first switch 71 of a scanning order change-over switch 40 and to contact $b$ of a third switch 73 thereof. The second output terminal 37 is connected to contacts $a$ and $b$ of a second switch 72. The third output terminal 38 is connected to contact $b$ of the first switch 71 and to a contact $a$ of the third switch 73. The reset terminal 39 is connected to a reset input of the gate circuit 34. The first switch 71 of the scanning order change-over switch 40 is connected to the controlled frequency divider 24, the second switch 72 is connected to the controlled frequency divider 25 and the third switch 73 is connected to the controlled frequency divider 26.

The control pulse generator 35 generates a control pulse signal 41 shown in FIGURE 4(d) from the first output terminal 36 when the first pulse of FIGURE 4(c) is supplied from the pulse generator 33 through the gate circuit 34, a control pulse 51 shown in FIGURE 4(e) from the second output terminal 37 when the second pulse is supplied, a control pulse 61 shown in FIGURE 4(f) from the third output terminal 38 when the third pulse is supplied, and a reset signal from the reset terminal 39 to close the gate 34 when the fourth pulse is supplied. With the foregoing arrangement, the first output terminal 36 generates control pulse signals 42, 43, 44 . . . during the time intervals $\tau$, and similarly, the second output terminal 37 and the third output terminal 38 generate control pulse signals 52, 53, 54 . . . and 62, 63, 64 . . . , respectively. The gate circuit 34 is periodically closed at time intervals $\tau$ which occur at the times $t_{21}$, $t_{22}$, $t_{23}$ . . . It will be observed that in this instance the time difference between the output pulses of the scan start angle pulse generator 33 is the same as the time differences between the respective pairs of control pulse signals 41 and 51, 51 and 61, 42 and 52, 52 and 62, . . . The output of the control pulse generator 35 supplies the control pulse signals 41, 42 . . . 51, 52 . . . 61, 62 . . . through the scanning order change-over switch 40 to the controlled frequency dividers 24, 25 and 26 to control the start and stop points of the frequency dividing operation of the controlled frequency dividers.

Figure 5A:
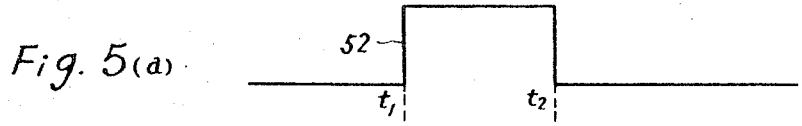
FIGURES 5(a)–5(c) are signal waveforms showing the operation of a frequency divider used in the beam scanning device of FIGURE 2.
Figure 5B:
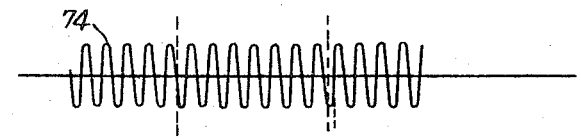
Figure 5C:
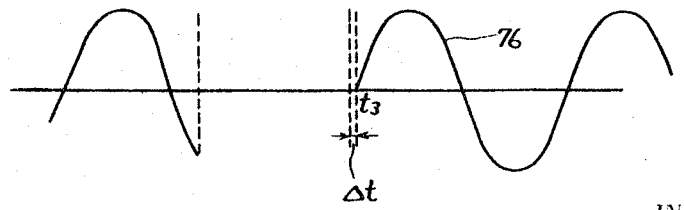

One method for controlling the start and stop points of the frequency dividing operation will be described in connection with FIGURES 5(a)–5(c). Let it be assumed that the pulse signal 52 in FIGURE 5(a) is the control pulse signal 52 in FIGURE 4(e), that is, one of the control pulse signals supplied from the second output terminal 37 of the control pulse generator 35 to the controlled frequency divider 25, on an enlarged time scale. The signal 74 in FIGURE 5(b) is assumed to be a signal supplied from the reference frequency oscillator 28 to the controlled frequency divider 25. The controlled frequency divider 25 stops its operation at the time $t_1$ which is the leading edge of the control pulse signal 52 and again starts the frequency dividing operation at the time $t_2$ which is the trailing edge of pulse 52. Since the signal 74 does not become zero, in general, at the time $t_2$, it starts the frequency dividing operation at the time $t_3$ which is the next zero level time of this signal, to supply a frequency divided signal 76 in FIGURE 5(c) to the frequency converter 20. In the same way, the controlled frequency dividers 24 and 26 also start their frequency dividing operations at the zero level of the reference frequency signal, the last said signals being controlled by the control signals fed from the control signal generator 35. If, for example, the frequency divider 25 is not accurate in its operation and a time difference $\Delta t$ exists between the times $t_2$ and $t_3$, a phase error will occur. However, if the frequency dividing ratio is assumed to be 64, an error angle $\Delta \theta$ corresponding to an error of $\Delta t$ is less than $2\pi/64$ which is substantially negligible.

From the foregoing it will be observed that the scan angle ⓗ can be changed by changing the interval at which the controlled frequency dividers 24, 25 and 26 are reset and this can be accomplished by adjusting the scan angle pulse generator 32 to change the period $\tau$ of the pulse signals in FIGURE 4(b).

If the above reset interval $\tau$ is increased, the ultimate phase differences between the outputs of the controlled frequency dividers 24, 25 and 26 increases the scan angle ⓗ. Since the period of the output pulse of the scan start angle pulse generator 33, shown in FIGURE 4(c), enables the adjustment of the time differences of the control pulses 41 and 51, 51 and 61, 42 and 52, 52 and 62 . . . of the control pulse generator 35, increasing the time interval increases the time differences between the control pulses. This action increases the phase differences of the outputs of the controlled frequency dividers 24, 25 and 26. Accordingly, the scan start angle $\theta$ of the received beam can be controlled by controlling the periodicity of the scan start angle pulse generator 33. In the abovementioned scanning order change-over switch 40, since the order of the control pulses to be supplied to the controlled frequency dividers 24, 25 and 26 is inverted both when the switches connect to the contacts indicated by the dotted lines and when they connect to the contacts indicated by the full lines, the scanning direction of the received beam is inverted. In other words, by operating the scanning order change-over switch 40, the received wave beam can be scanned, for example, from the narrow beam 5 to 6 or from 6 to 5 as shown in FIGURE 1. An angle sweep circuit 77 is used for indicating echos or signals detected by scanning the received waves and will be described with reference to FIGURE 3.

Figure 3:
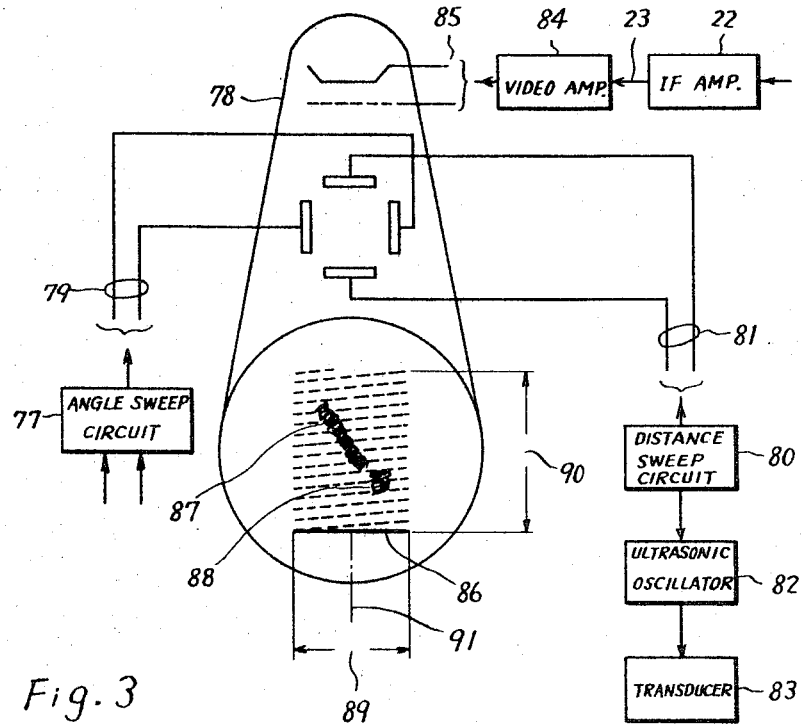
FIGURE 3 is a combination block and schematic diagram showing a receiver for use with the beam scanning device of FIGURE 2.

FIGURE 3 shows one embodiment of an automatic beam scanning device for supersonic waves received by the apparatus of FIGURE 2. Such a device is suitable for quickly and automatically detecting obstacles, shoals and the like in water. The characteristics of this device are as follows:

| | |
|---|---|
| Frequency of received wave | 30 kc. |
| Scanning width | About 60°. |
| Beam width | About 10°. |
| Accuracy of scan | About 3°. |
| Beam width of receiving transducer element | About 60°. |
| Number of sets of receiving transducer elements | 6 sets. |
| Repetition period of automatic scanning | 1/30 second. |
| Intermediate frequency | 10 kc. |
| Frequency dividing ratio of the controlled frequency dividers | 64:1. |
| Center frequency of reference frequency oscillator | 40 kc.×64=2560 kc. |
| Number of reference frequency oscillators | 6 sets. |
| Frequency difference between respective sets of reference frequency oscillators | 2.56 kc. |
| Control pulse generator | six stage type shift register. |

It is evident from the above parameters, in the present embodiment, that it is possible to scan automatically a selected angle with a high degree of directivity since the resultant directivity is obtained by dividing an inherent beam width of the receiving transducer element by the number of arrays of the elements at a period of 1/30 second over a range of about 60°. As described above, the frequency of the scanning angle pulse generator 32 may be increased in order to reduce the automatic scanning range, that is, the scanning angle ⓗ and the frequency of the scan start angle pulse generator 33 may be changed in order to change the angle $\theta$ at which the automatic scanning starts.

It follows from the above that, in order to reduce the beam width for the automatic scanning, the number of arrays of receiving transducer elements 16, 17 and 18 and the number of sets of the reference frequency oscillators 27, 28 and 29 and the controlled frequency dividers 24, 25 and 26 may be increased. Moreover, the receiving transducer elements need not be single units but may be combinations of a plurality of units.

FIGURE 3 illustrates a device for combining an automatic scanning device for a received beam and an ultrasonic wave pulse transmitting device to indicate positions of bodies in water as a fluorescent image on a cathode ray tube.

An angle sweep circuit 77 applies a deflection signal to the cathode ray tube 78, corresponding to an angle of the received wave beam in accordance with the outputs of the scanning angle pulse generator 32 and the scan start angle pulse generator 33 described in connection with FIGURE 2. That is, the output of the angle sweep circuit 77 is supplied to horizontal deflection conductors 79 of the tube 78 to move the electron beam in synchronization with the angle of the received wave beam. A distance sweep circuit 80 applies a deflection output of a waveform corresponding to a distance to the vertical deflection conductors 81 to move the electron beam vertically in correspondence with the distance. An ultrasonic oscillator 82 supplies an intense ultrasonic wave pulse to a transmitting transducer 83 at the instant that the distance sweep circuit 80 starts to supply a sweep output. In this case, the transmitting transducer 83 should be arranged to emit efficiently the supersonic wave over the whole scanning range of the received beam. A video amplifier 84 detects and amplifies the intermediate frequency output 23 of the intermediate frequency amplifier 22, including echos of objects reflected to the transducers and applies this to a brightness modulation lead conductor 85.

If the electron beam of the cathode ray tube 78 is adjusted so that the fluorescent image appears only when the output of the video amplifier 84 appears, an image 86 of the transmitted pulse wave and images of the echos 87 and 88 can be obtained. Further, if the output of the angle sweep circuit 77, the output of the distance sweep circuit 80, and the electron beam of the cathode ray tube 78 are adjusted correctly, it is possible to cause the horizontal deflection width 89 to correspond to the directional angle of the received beam, the vertical deflection width 90 to the distance scale and the center line 91 to the center of the scanning angle of the received beam. Accordingly, it is possible to indicate precisely the position of the objects on the tube 78.

The invention as described above can be applied to sonar and radar devices and can also be used to provide a scanning device for ultrasonic waves and as an antenna for use in the microwave band.

We claim:
1. Beam scanning apparatus for sonic, ultrasonic and electromagnetic wave energy, comprising a plurality of transducers arranged in a predetermined spaced relationship, a reference frequency oscillator for each transducer, the frequency of said oscillators differing one from the others, frequency dividers connected with said oscillators for frequency dividing the respective outputs of the reference frequency oscillators in a predetermined ratio, a scan start angle control device for controlling the time at which each frequency dividing operation is initiated to provide phase differences between the respective output signals of said frequency dividers and thereby determine the scan start angle of the resultant composite wave pat- tern of said transducers, and a scanning angle control device connected with said dividers and controlling the time intervals of the frequency dividing operations of said frequency dividers to control the scanning angle of said transducers.

2. Apparatus according to claim 1 in which the scan start angle control device and the scanning angle control device are pulse generators and said generators are adjustable to vary the scan start angle and the scanning angle.

3. Beam scanning apparatus according to claim 2 including a control pulse generator having a plurality of outputs corresponding to the number of dividers, connections between each output and one of said dividers and a gate connecting the first said pulse generators to said control pulse generator.

4. Beam scanning apparatus according to claim 3 including switching means interconnecting said control pulse generator with said dividers to interchange connections between the outputs of said control pulse generator and said dividers.

5. Beam scanning apparatus according to claim 3 including switching means between said reference frequency oscillators and said dividers whereby a single oscillator may feed all of said dividers.

6. Beam scanning apparatus according to claim 1 wherein said transducers function as receiving elements for signals, a frequency converter for each transducer, means feeding the received signals of each transducer to one of said converters, a cathode ray tube having an electron beam and a fluorescent screen for forming an image on said tube and means including an amplifier connecting said converters to said tube to modify the intensity of said cathode ray tube beam.

7. Beam scanning apparatus according to claim 6 wherein said cathode ray tube beam is deflected in one direction in synchronism with the angular movement of said resultant composite wave pattern, means for transmitting energy pulses, and means deflecting said cathode ray tube beam in another direction in accordance with the magnitude of the time differences between each transmitted pulse and a reflection of said pulse arriving at said transducers.

References Cited
UNITED STATES PATENTS 2,426,460   8/1947   Lewis _____ 343—100 X RODNEY D. BENNETT, Jr., Primary Examiner T. H. TUBBESING, Assistant Examiner U.S. Cl. X.R.

340—6; 343—100, 854